United States Patent
Xiao et al.

(10) Patent No.: US 7,907,778 B2
(45) Date of Patent: Mar. 15, 2011

(54) SEGMENTATION-BASED IMAGE LABELING

(75) Inventors: Jing Xiao, Cupertino, CA (US); Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 883 days.

(21) Appl. No.: 11/891,781

(22) Filed: Aug. 13, 2007

(65) Prior Publication Data

US 2009/0046931 A1 Feb. 19, 2009

(51) Int. Cl.
- G06K 9/00 (2006.01)
- G06K 9/34 (2006.01)
- G06K 9/38 (2006.01)
- G06K 9/62 (2006.01)
- G06K 9/36 (2006.01)
- G06K 9/46 (2006.01)
- G06K 9/40 (2006.01)

(52) U.S. Cl. ......... 382/180; 382/168; 382/171; 382/172; 382/173; 382/176; 382/224; 382/232; 382/239; 382/260; 382/261

(58) Field of Classification Search .................. 382/180, 382/176, 173, 168, 171, 172, 224, 239, 232, 382/261, 260
See application file for complete search history.

(56) References Cited

U.S. PATENT DOCUMENTS

| | | | |
|---|---|---|---|
| 6,044,179 A * | 3/2000 | Savakis | 382/270 |
| 6,301,386 B1 * | 10/2001 | Zhu et al. | 382/176 |
| 6,771,816 B1 | 8/2004 | Gaither | |
| 2002/0131642 A1 * | 9/2002 | Lee et al. | 382/220 |
| 2003/0198381 A1 | 10/2003 | Tanaka et al. | |
| 2004/0096102 A1 | 5/2004 | Handley | |
| 2005/0180642 A1 | 8/2005 | Curry et al. | |
| 2005/0180647 A1 * | 8/2005 | Curry et al. | 382/243 |
| 2005/0275897 A1 | 12/2005 | Fan et al. | |
| 2005/0281474 A1 | 12/2005 | Huang | |
| 2006/0274381 A1 * | 12/2006 | Simard et al. | 358/426.06 |
| 2007/0086675 A1 * | 4/2007 | Chinen et al. | 382/284 |
| 2007/0189615 A1 * | 8/2007 | Liu et al. | 382/232 |

* cited by examiner

*Primary Examiner* — Jingge Wu
*Assistant Examiner* — Bernard Krasnic

(57) ABSTRACT

Systems and methods for segmenting an image into at least two layers, a foreground and a background layer include rough labeling or segmenting at least a portion of the image into foreground and background pixels. The rough labeled pixels may be refined by using local classifications. Additional processes may be performed on the image including, but not limited to, filtering, image enhancing, shape refining, image compression, etc.

15 Claims, 14 Drawing Sheets

1105
Input Image

1110
Enhanced Image

FIGURE 11

1305
Before shape refinement

1310
After shape refinement

FIGURE 13

SEGMENTATION-BASED IMAGE LABELING

BACKGROUND

A. Technical Field

The present invention pertains generally to image processing, and relates more particularly to image processing that allows for segmenting images into at least two segments, foreground and background. The present invention may be incorporated into systems and methods.

B. Background of the Invention

A digital image typically comprises an array of picture elements. Each picture element, also known as a "pixel," has a value and a location within the array. The value represents either the intensity of the pixel (if in grayscale) or the color of the pixel. At a higher level, pixels may be segmented into two or more groups. For example, pixels of an image may be classified into foreground and background layers or segments.

When processing a digital image, it can be beneficial to differentiate the pixels into different segments. Certain segments of the image may be of more interest than other segments, may be beneficially affected by image processing procedures, or may be adversely affected by image processing procedures. By dividing an image into different segments, one segment may be processed differently than another segment.

For example, one application of segmentation is document compression. Although compression methods help reduce file sizes, the compressed files are typically not without problems. Conventional image compression approaches that compress an entire image generally lead to unsatisfactory results in reconstructed image quality and compressed file size. When a high compression ratio is used, the compressed images may show disturbing artifacts, such as blurred text and blurred color boundaries. To obtain a high-quality compressed image, the compression ratio may need to be set very low, but the resulting file size will therefore not be substantially reduced. Thus, neither approach is particularly satisfactory. By segmenting an image into foreground and background regions, the foreground may be compressed at a different level than the background.

SUMMARY OF THE INVENTION

Aspects of the present invention provide systems and methods for processing an image. In embodiments, a plurality of pixels selected from an image may be labeled or segmented into groups. In embodiments, the segmented image may undergo additional processing, such as image enhancement, compression, format conversion, watermarking, special effects, video editing, etc. In an embodiment, the segmented image may be used to generate a composite image, such as a portable document format image.

In an embodiment, a method for processing an image may comprise rough labeling of the image into different segments. In an embodiment, the rough labeling may be performed by dividing at least a portion of the image into color histograms and using the histograms to identify dominant pixels. For example, in an embodiment, the foreground pixels may comprise the union of the dominant cluster of pixels in a region of each of the color channels. If the foreground is light, then the cluster is in the lighter region of the color channel. If the foreground is dark, then the cluster is in the darker region of the color channel.

In an embodiment, the rough labels may be refined by using local classification, such as local color or intensity classification. In an embodiment, the rough labels may be refined by selecting at least some of the pixels from the set of foreground pixels and for each selected foreground pixel, classifying pixels in a region surrounding the selected foreground pixel into one of two sets: (1) a first set of pixels comprising pixels in the region that have an intensity that is within an intensity threshold value of the intensity of the selected foreground pixel; and (2) a second set of pixels comprising pixels in the region that do not have an intensity that is within an intensity threshold value of the intensity of the selected foreground pixel. Having classified the pixels into two classes, a first average intensity of the first sets of pixels may be computed and a second average intensity of the second set of pixels may be computed. For a light background image, if the first average intensity is close to or brighter than the second average intensity, the selected foreground pixel may be refined to be a background pixel. For a dark background image, if the first average intensity is close to or darker than the second average intensity, the selected foreground pixel may be refined to be a background pixel.

In embodiments, additional operations may be performed. In an embodiment, the image may undergo adaptive filtering and the labels of the filtered image may be refined. In an embodiment, the refined labels may be used to enhance the foreground colors of the image. In an embodiment, the labels may be further refined by regulating their shapes.

In an embodiment, the labels may be refined by regulating shapes of pixel groups by performing one or more of the steps comprising: grouping the foreground pixels into linear segments; responsive to a segment being less than a size threshold value, increasing a thickness of the segment if at least one corresponding orthogonal stroke of the segment exceeds a first long length threshold value and there are no other orthogonal strokes within a first proximity threshold value distance; responsive to a segment being less than a size threshold value, increasing a thickness of the segment if a neighboring segment is within a second proximity threshold value and their corresponding orthogonal strokes are less than a first short length threshold value; and responsive to neighboring segments exceeding a second long length threshold value, connecting the neighboring segments if they are within a third proximity threshold value and their corresponding orthogonal strokes are less than a second short length threshold value.

One skilled in the art shall recognize that having obtained the labels, any of a number of post-processing operations may be performed and that none of these operations are critical to the present invention.

Aspects of the present invention may be incorporated or included in a device or system. Aspects of the present invention also include a device or system for segmenting into foreground and background pixels. In embodiments, the device or system may comprise a pixel labeler that assigns a foreground or a background label to image pixels and a pixel label refiner that refines the labels by local characteristic classification. In an embodiment the pixel label refiner may classifying pixels in a region surrounding a selected foreground pixel into two sets: (1) a first set of pixels comprising pixels in the region that have an intensity that is within an intensity threshold value of the intensity of the selected foreground pixel; and (2) a second set of pixels comprising pixels in the region that do not have an intensity that is within an intensity threshold value of the intensity of the selected foreground pixel. The average intensities of the two sets may be calculated and responsive to a light background and the first average intensity being close to or brighter than the second average intensity, the pixel label refiner may classify the selected foreground pixel as a background pixel. In an embodiment, the pixel label refiner may also, responsive to a dark background and the first average intensity being close to or darker than the second average intensity, classify the selected foreground pixel as a background pixel.

In an embodiment, the device or system may further comprise an adaptive filter that generates a filtered image by smoothing pixels with a foreground label separately from pixels with a background label.

In an embodiment, the device or system may further comprise an enhancer that uses the foreground and background pixel labels to enhance the colors of at least some of the pixels with a foreground label.

In an embodiment, the device or system may further comprise a shape refiner that refines the foreground and background pixel labels by regulating shapes of foreground pixel segments.

In an embodiment, the device or system may further comprise a layer-based compression module that compresses at least one of foreground pixels and background pixels.

It should be noted that the teachings of the present invention may be implemented in any device or system that is capable of processing a digital image, included but not limited to computers, multimedia devices, scanners, printers, copiers, cameras, facsimile machine, and the like.

Aspects of the present invention may be implemented in a wide variety of ways including software, hardware, firmware, or combinations thereof. For example, the functions to practice various aspects of the present invention may be performed by components that are implemented in a wide variety of ways, including discrete logic components, one or more application specific integrated circuits (ASICs), and/or a program or programs of instructions for execution by one or more program-controlled processors. It shall be noted that the manner in which the present invention is implemented is not critical.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 11 depicts an example of an enhanced image obtained from an image according to an embodiment of the invention.

FIG. 13 depicts an example of an image prior to shape refinement and after shape refinement according to an embodiment of the invention.

DETAILED DESCRIPTION OF THE PREFERRED EMBODIMENTS

Figure 1:
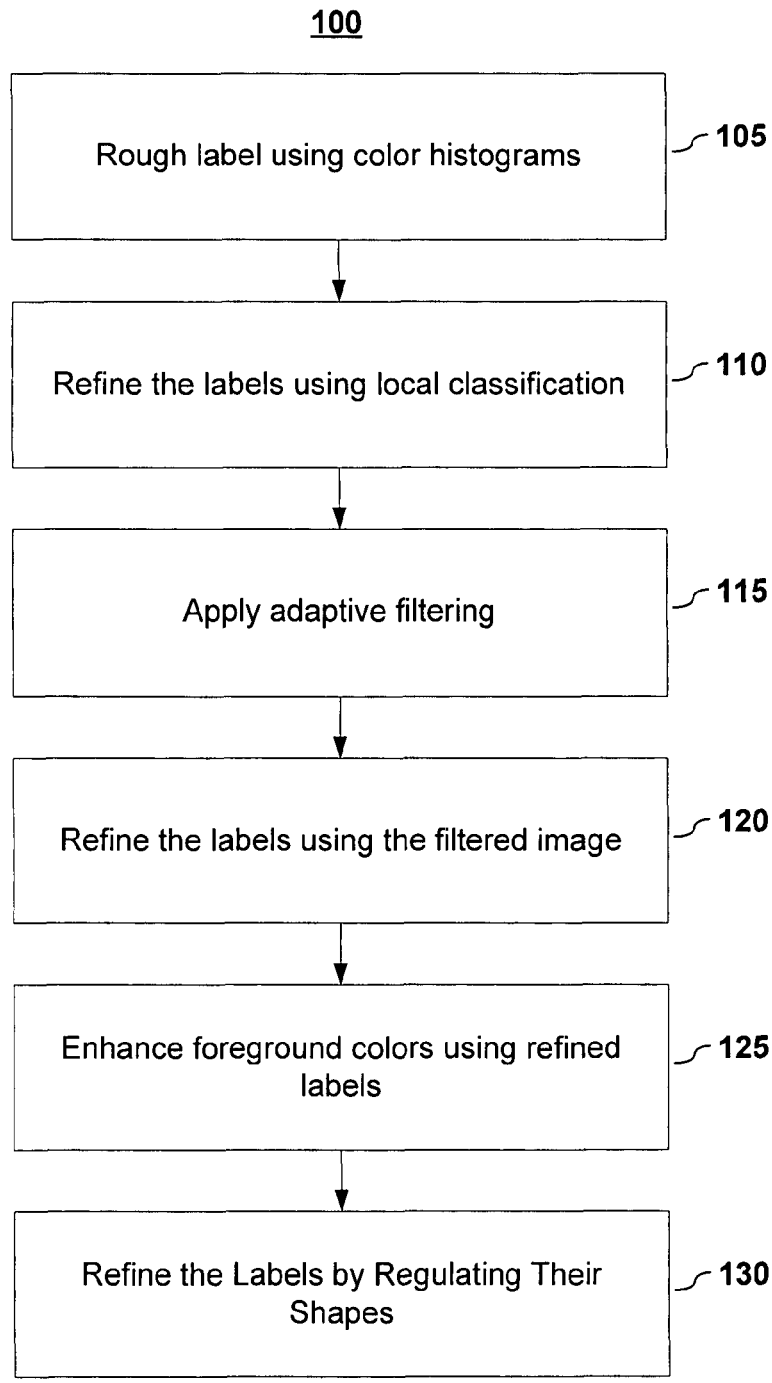
FIG. 1 depicts a method for segmenting an image according to an embodiment of the invention.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including camera, scanners, printers, computers, facsimile machine, mobile devices, including those devices with a display or camera capabilities, multimedia devices, and the like. The embodiments of the present invention may be implemented in software, hardware, firmware, or combinations thereof. Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrating within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment" or "an embodiment" means that a particular feature, structure, characteristic, or function described in connection with the embodiment is included in at least one embodiment of the invention and may be in more than one embodiment. The appearances of the phrase "in one embodiment" or "in an embodiment" in various places in the specification are not necessarily referring to the same embodiment.

Disclosed herein are systems and methods for processing an image. In embodiments, an image may be segmented into background and foreground layers. In embodiments, the segmented image may undergo additional processing, such as image enhancement, compression, format conversion, watermarking, special effects, video editing, etc. In an embodiment, the segmented image may be used to generate a composite image, such as a portable document format image.

It should be noted that the examples illustrated herein deal with images with light background and darker foreground. The examples are provided by way of explanation and not limitation. One skilled in the art shall recognize that the systems and methods discussed herein may be applied to or adapted for images with dark background and lighter foreground. For example, in an embodiment, the present system and methods may negate the color of the image and process the image using the same or similar methods as disclosed herein. In an embodiment, the present systems and methods may determine, for an image or a section of an image, whether it is a light background/darker foreground or dark background/lighter foreground image.

FIG. 1 depicts an embodiment of a method 100 for processing an image according to an embodiment of the invention. As illustrated in the embodiment depicted in FIG. 1, segmenting of the image may begin by rough labeling (105) of the image into different segments. In an embodiment, the rough labeling may be performed by dividing at least a portion of the image into color histograms. The rough labels may be refined (110) by using local classification, such as local color or intensity classification.

In an embodiment, the remaining steps (115-130) of the depicted method 100 may be considered post-processing operations and may be performed as alternative embodiments. One skilled in the art shall recognize that having obtained the refined labels, any of a number of post-processing operations may be performed and that none of these operations are critical to the present invention. The depicted method 100 illustrates an embodiment of post-processing operations. In an embodiment, the image may undergo adaptive filtering (115) and the labels of the filtered image may be refined (120). In an embodiment, the refined labels may be used to enhance (125) the foreground colors of the image. In an embodiment, the labels may be further refined (130) by regulating their shapes.

Additional details for each of the foregoing steps (105-130) of method 100 shall be provided below.

A. Rough Labeling Using Color Histograms

Foreground pixels, such as by way of example and not limitation, texts, tables, charts, and the like, are usually dark in at least one of the three color channels. This tendency of the foreground pixels to be dark in at least one of the three color channels may be used to initially label, or rough label, the image.

Figure 2:
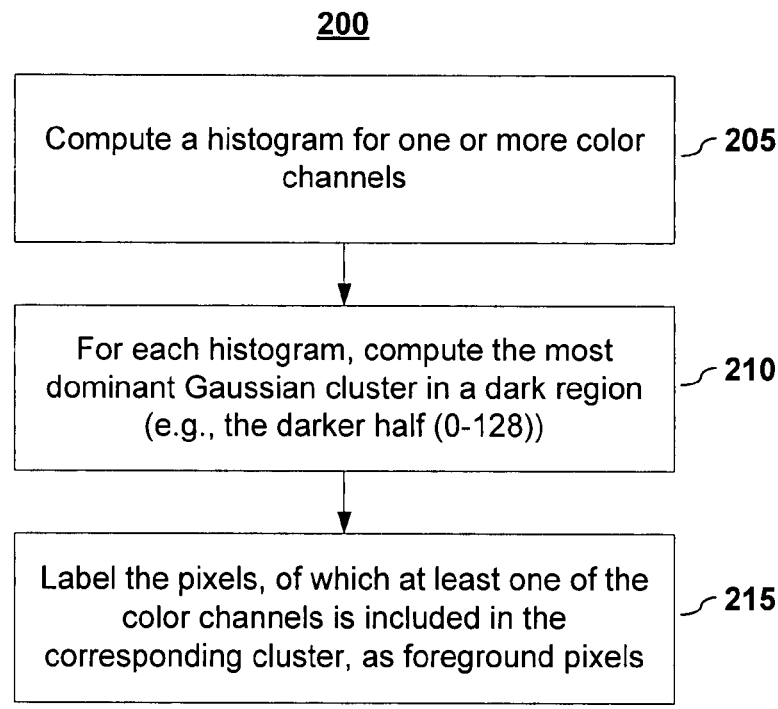
FIG. 2 illustrates a method for rough labeling pixels of an image using color histograms according to an embodiment of the invention.

FIG. 2 illustrates a method 200 for rough labeling pixels of an image using color histograms according to an embodiment of the invention. In the depicted embodiment, rough labeling of the image may commence by computing (205) histograms for each of the three color channels (e.g., red, green, and blue). In an alternative embodiment, fewer than all of the color channels may be used. In an embodiment, the number of bins of the histogram may be 256, although it shall be noted that no particular number of bins is critical to the present invention.

For each color channel histogram, the most dominant Gaussian cluster in a dark region may be computed (210). In an embodiment, the dark region may be the darker half of the image (e.g., 0-128 for an image with possible color values from 0-255). In an embodiment, the mean, $\mu$, and the variance or standard deviation, $\sigma$, of the darker half may be computed. Portions of the select region may be pruned by selecting a new region. In an embodiment, the new region may be, by way of example and not limitation: $[\mu-2.5\sigma, \mu+2.5\sigma]$.

A new mean, $\mu_n$, and a new standard deviation, $\sigma_n$, may be calculated for the new region. And, the process may be repeated until the difference between successive means, successive deviations, or both are less than a threshold value or values. The most dominant Gaussian cluster may be defined as the set of pixels within the final region.

Having obtained a dominant Gaussian cluster for one or more color channels, a pixel of which at least one of its three colors was included in the corresponding channel Gaussian cluster may be labeled (215) as a foreground pixels. That is, in an embodiment, the set of pixels formed by the union of the dominant Gaussian clusters of the color channels may be labeled as foreground pixels.

Figure 3:
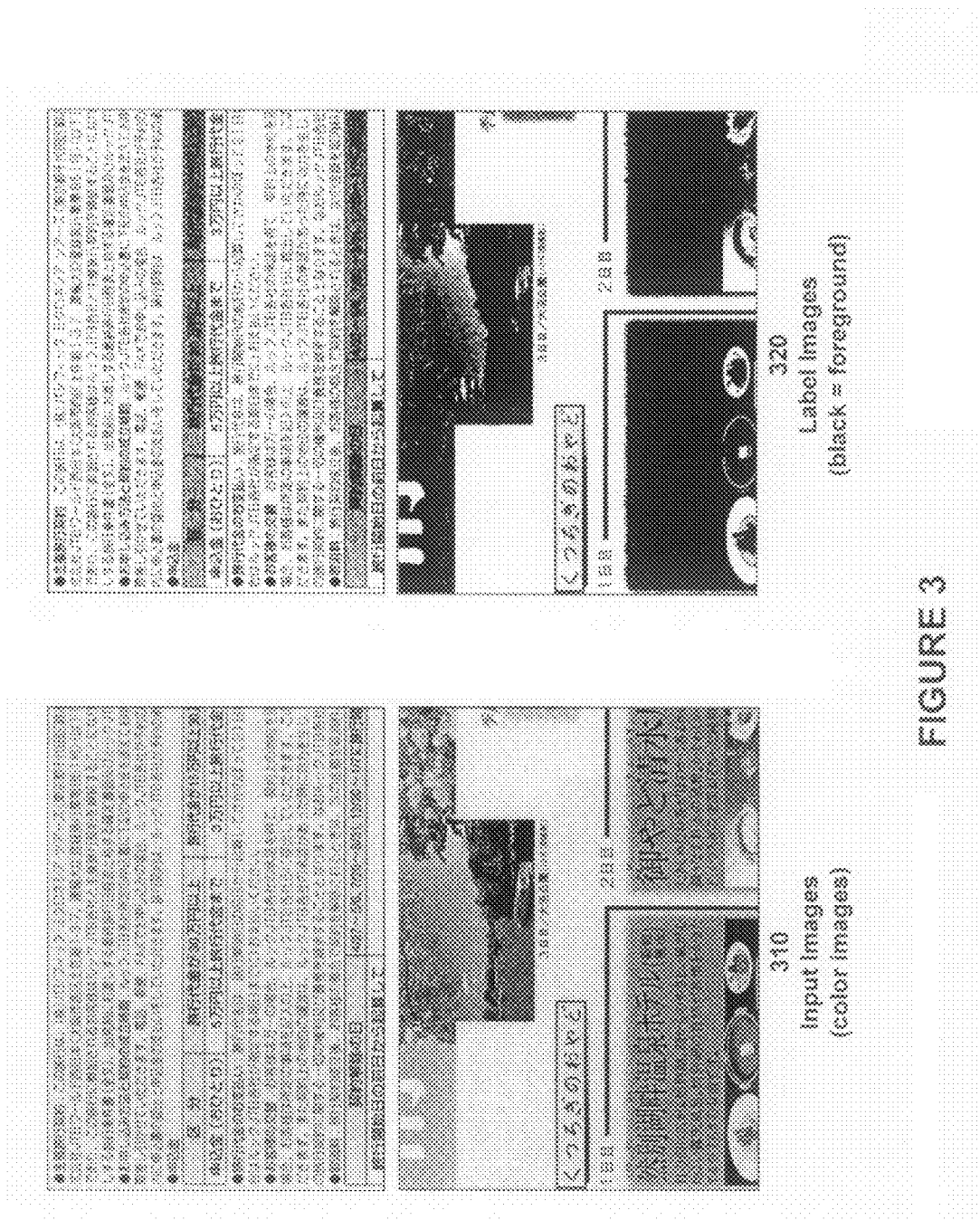
FIG. 3 depicts examples of input images and labeled images using histogram labeling according to an embodiment of the invention.

FIG. 3 depicts two sets of input images 310 and the resulting rough labeled images 320 after having been labeled using histogram labeling according to the embodiment of the method depicted in FIG. 2. In the depicted examples 320, the pixels that have been labeled as foreground pixels are black in color.

One skilled in the art shall recognize that other pixel labeling methods or segmentation methods may be used to label pixels from the image.

B. Refining the Labels Using Local Characteristic Classification

To achieve salient perception, it has been observed that the local area around a foreground pixel or pixels often contains a number of brighter pixels. In an embodiment, the rough labeled image may be refined using this observation.

Figure 4:
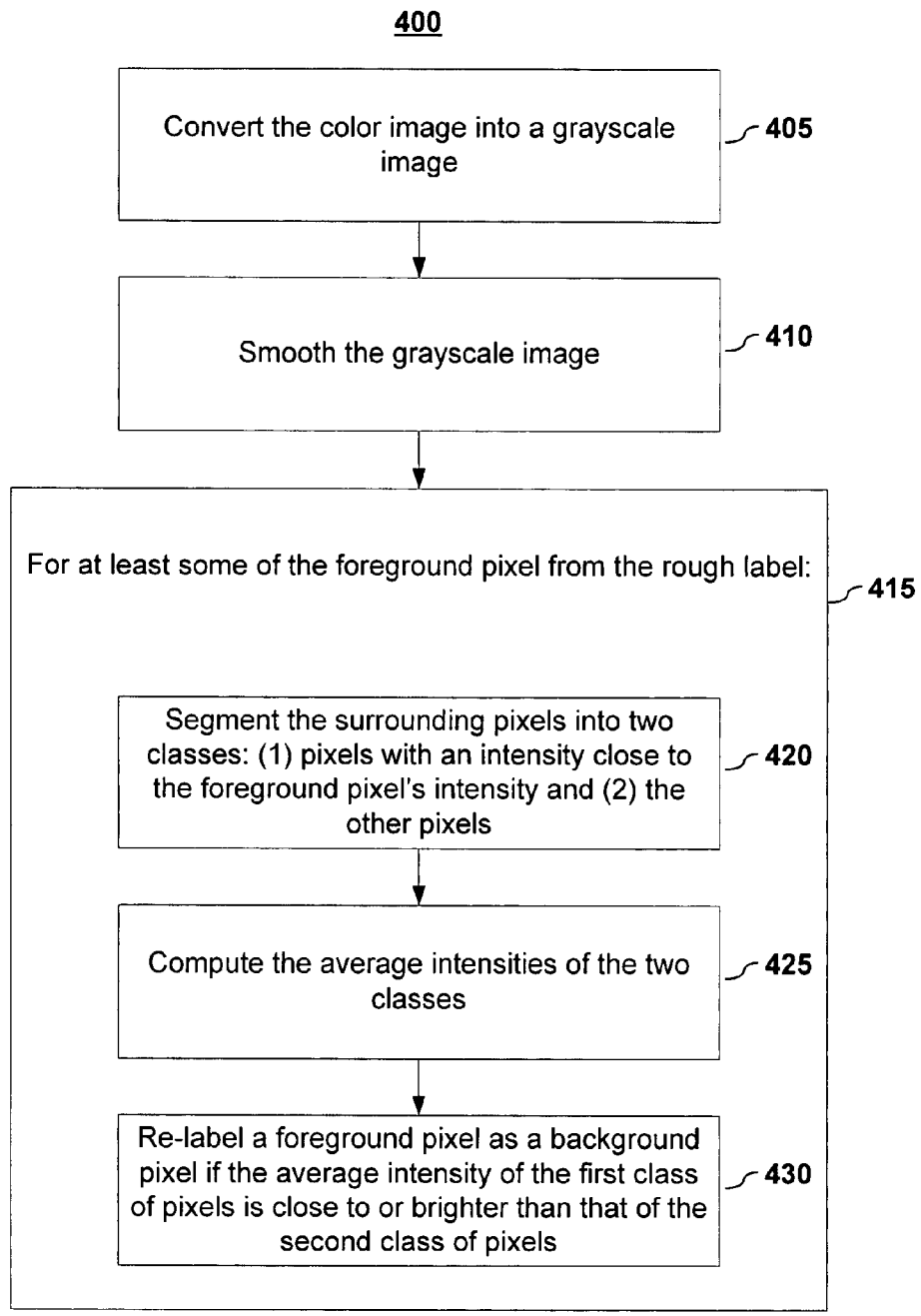
FIG. 4 illustrates a method for refining the labels using local characteristic classification according to an embodiment of the invention.

FIG. 4 illustrates a method 400 for refining the labels using local classification according to an embodiment of the invention. As depicted in FIG. 4, the color image may be converted (405) into a grayscale image to obtain the intensity information. If the image is already a grayscale image, this step need not be performed. In an embodiment, the grayscale image may be smoothed (410). In one embodiment, the grayscale image may be smoothed (410) by Gaussian filtering.

For at least some of the foreground pixels from the rough labeling, the following steps 415 may be performed. In an embodiment, the pixels within a local region may be divided (420) into the two classes according to the following conditions:

$$I_i = \begin{cases} \text{Class 1}, & \text{for } \|I_i - I_x\| \leq T_0 \\ \text{Class 2}, & \text{for } \|I_i - I_x\| > T_0 \end{cases}$$

where $I_x$ represents the intensity of the foreground pixel of interest, $I_i$ represents the intensity of a surrounding pixel within the local region, and $T_0$ represents a threshold value. For a foreground pixel, the pixels surrounding the foreground pixel may be divided (420) into two classes: pixels with the intensity close to the foreground pixel and pixels with an intensity that are not close to the foreground pixel's intensity.

In an embodiment, the classification may be obtained by setting a local window or region, such as a 7×7 region with the foreground pixel of interest at the center of the region. It should be noted that other sized local regions may also be employed.

Having separated the pixels in the local region into two classes (Class 1 and Class 2), the average (mean, median, or mode) intensities of each class may be calculated (425). If the average intensity of Class 1 (the group of pixels with an intensity close to the foreground pixel's intensity) is close to (such as, by way of example but not limitation, within 10 grayscale units) or brighter that the average intensity of Class 2 (the group pixels with an intensity that is not close to the foreground pixel's intensity), this foreground pixel may be re-labeled (430) as a background pixel.

Figure 5:
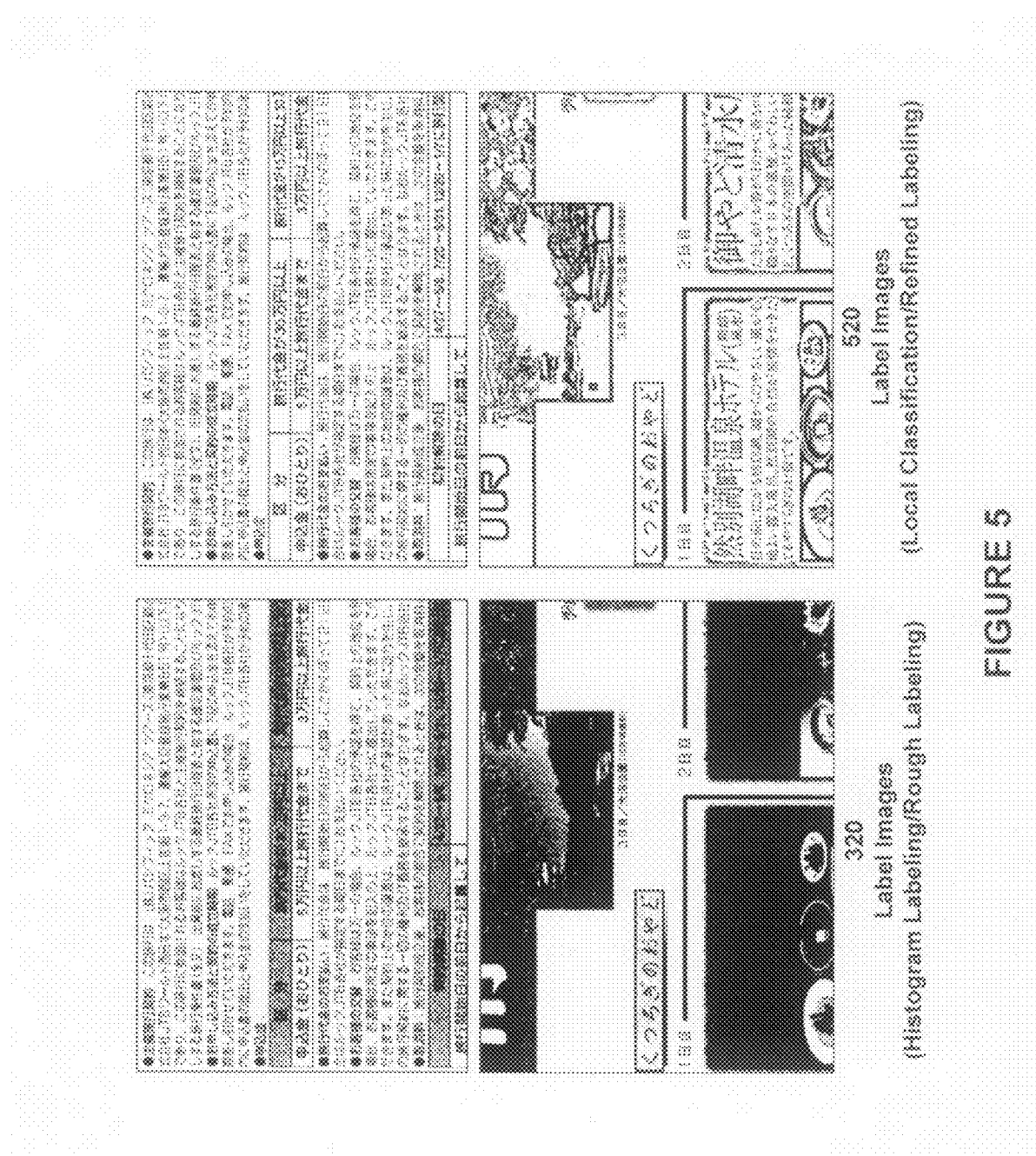
FIG. 5 depicts examples of refined labeled images using local classification according to an embodiment of the invention.

FIG. 5 depicts examples of refined labeled images 520 using local classification according to an embodiment of the invention. As shown in FIG. 5, the rough labeled images 320 as initially depicted in FIG. 3 are shown after having the labels refined using local classification according to the embodiment of the method depicted in FIG. 4.

In embodiments, the method for segmenting the image may conclude at this stage with the refined labels. In embodiments, the segmented image may be processed for various purposes and may undergo additional processing.

C. Adaptive Filtering

Figure 6:
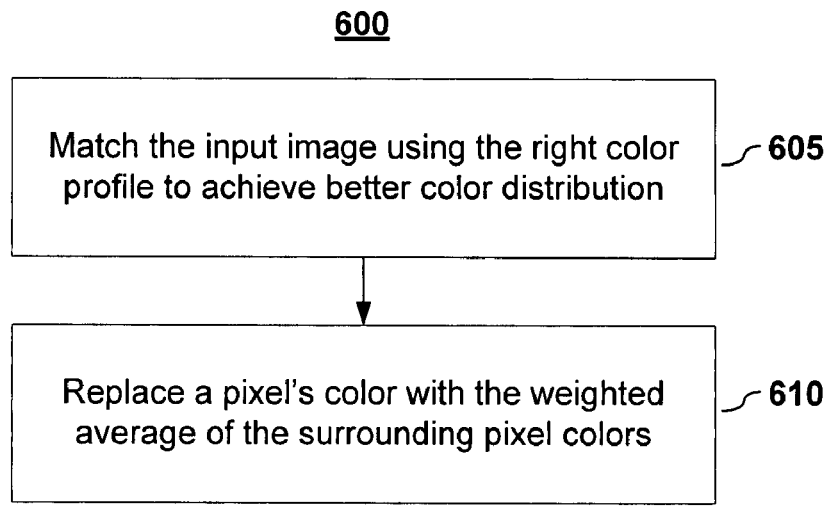
FIG. 6 illustrates a method for adaptive filtering using the labels according to an embodiment of the invention.

In an embodiment, the labels may be used to adaptively filter the image. Based on the labels, the foreground and background pixels may be filtered separately to smooth noise and strong half-tone patterns while keeping text boundaries sharp. FIG. 6 illustrates a method 600 for adaptive filtering using the labels according to an embodiment of the invention.

As depicted in FIG. 6, in an embodiment, the input image may be matched (605) using the right color profile to achieve better color distribution. In an embodiment, a scanner may be used to create a digital version of a hard copy document, that is, a physical medium, e.g., paper document. Other devices, such as a printer, copier, camera, or facsimile machine may also be used to generate a digital version of a physical document. The term "scanned document" is used herein to refer to a digital document generated from a physical document by any of these or other known means. In an embodiment, the scanned document, which is typically captured in RGB color space, may be converted into a device-independent perceptually-uniform color space. In an embodiment, this conversion may employ a color profile of the scanner and a white point reference color, which information may be supplied by a look-up table.

In an embodiment, given a scanner, printer, copier, or display color profile, the colors of the image, or one or more layers derived from the image, may be adjusted so that the image colors more closely match the original document. It should be noted that color matching may also be beneficial when the image information is being communicated between devices, such as, for example from one copier to another copier or to a computer screen. Accordingly, the color matching may provide adjustments given the intended output display. In embodiments, the labeled image may be used to perform differential enhancement for viewing or printing of the compressed image. For example, printing often requires higher levels of sharpening for high-quality text than what would be required for viewing on a computer screen. The label information may also be used to switch between printer/screen color tables to improve the rendering of the image or portions thereof, such as non-halftone edges that typically correspond to text on background regions. For example, lower frequency screens may be used over halftone edge pixels or halftone pixels to improve tone stability in devices such as color laser printers and may also provide a greater number of tones.

In an embodiment, a pixel may have its color replaced (610) with the weighted average of the surrounding pixel colors. In one embodiment, the weights may be determined by the label and color similarity between the pixel of interest and its surrounding pixels. For example, a local region may be set, such as a 7×7 region. In an embodiment, the color of the pixel of interest, $C_x$, may be according to the following:

$$C_x = \sum_{i=1}^{k} w_i C_i$$

$$\text{where } w_i = \begin{cases} 0 & \text{when the label of } C_i \neq \text{the label of } C_x \\ e^{-\frac{\|C_i - C_x\|^2}{\sigma^2}} & \text{when } C_i \text{ and } C_x \text{ have the same label} \end{cases}$$

where σ is the standard deviation of the spatial distance in the window and is a constant given the window size.

One skilled in the art shall recognize other methods to adjust the color of a pixel based upon surrounding pixel colors. No particular method is critical to the present invention.

Figure 7:
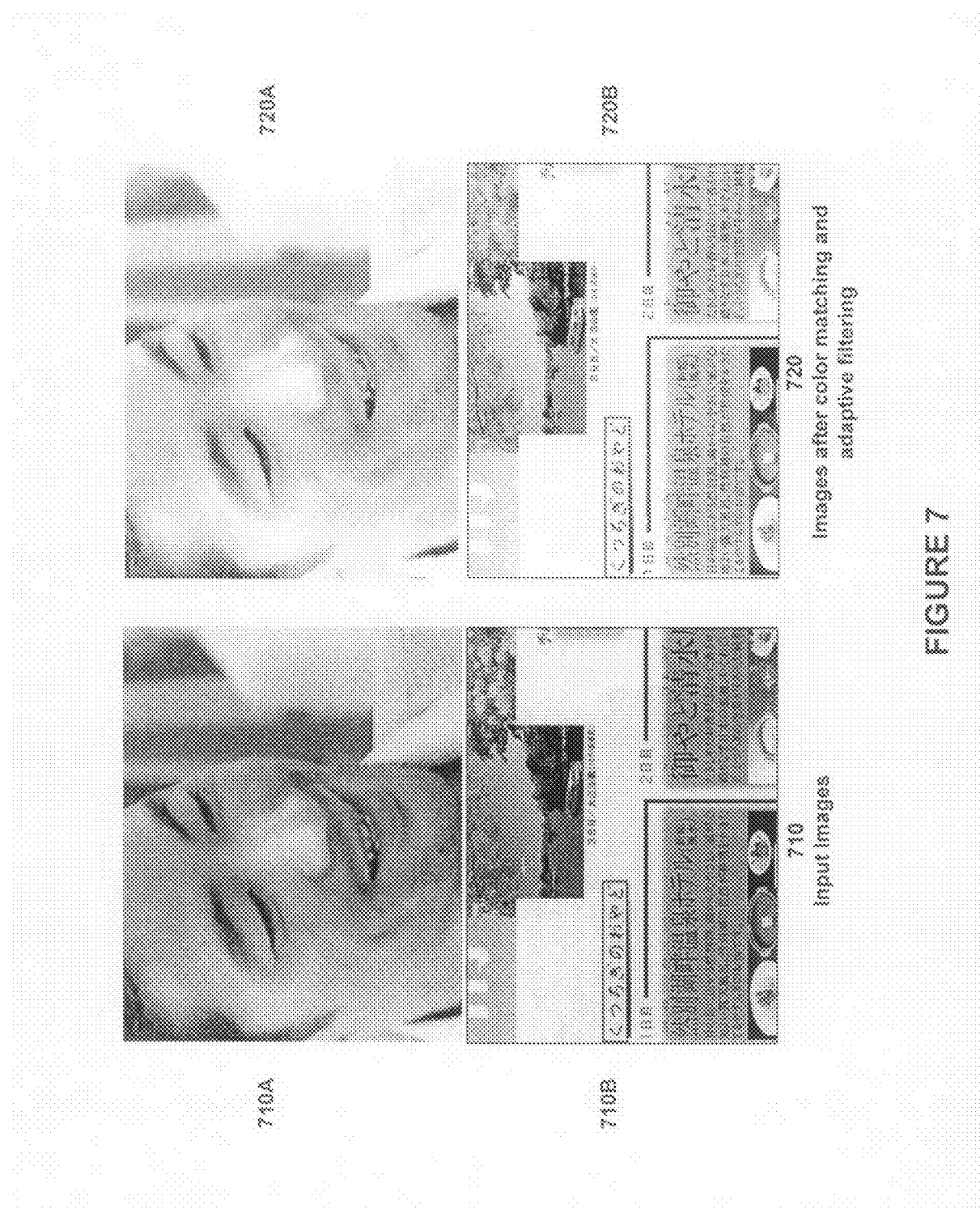
FIG. 7 depicts examples of images after color matching and adaptive filtering according to an embodiment of the invention.

For purposes of illustration, FIG. 7 depicts two sets of input images 710A and 710B and the corresponding images 720A and 720B (respectively) after color matching and adaptive filtering according to an embodiment of the invention.

D. Refine the Labels Using the Filtered Image

Figure 8:
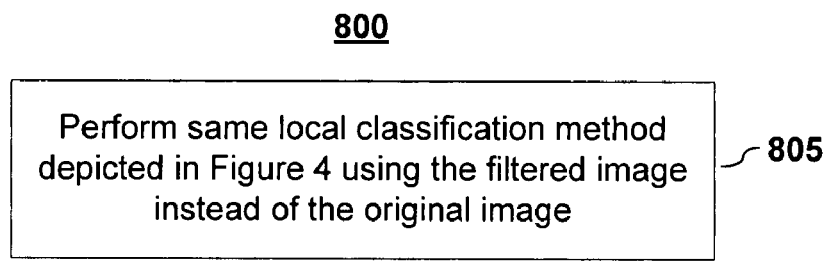
FIG. 8 illustrates a method for refining the labels using local classification according to an embodiment of the invention.

FIG. 8 illustrates a method for refining the labels using local classification according to an embodiment of the invention. In an embodiment, the local classification method depicted in FIG. 4 may be performed (805) but using the filtered image instead of the original image. That is, the filtered image may undergo local classification refinement in like manner as the rough labeled image as described with reference to the method depicted in FIG. 4.

Figure 9:
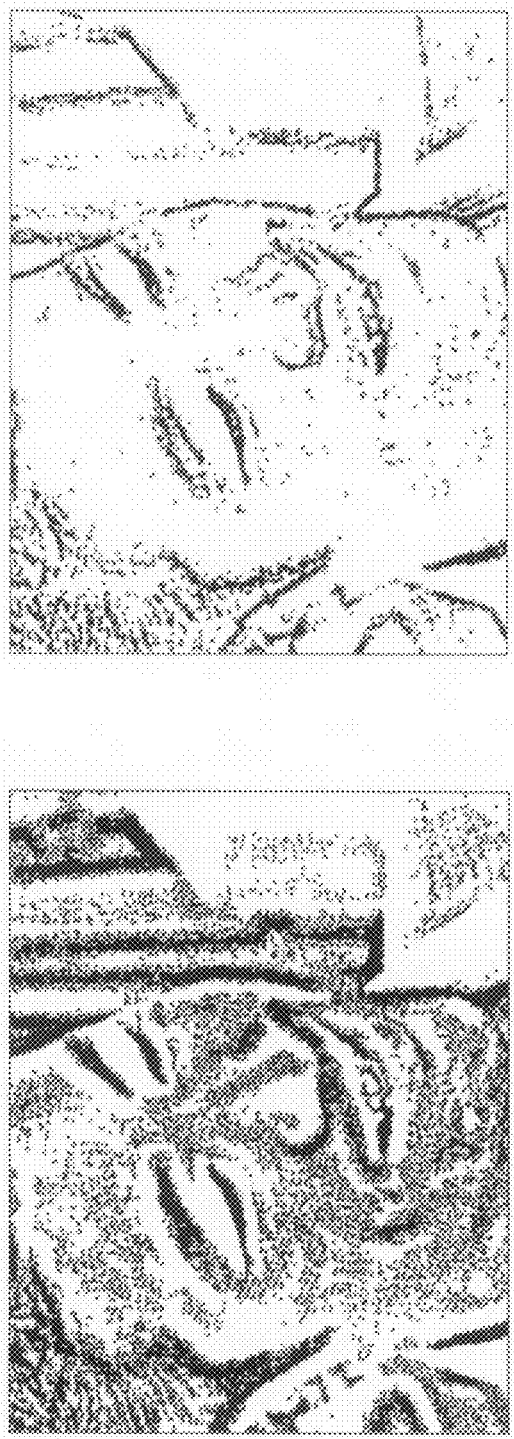
FIG. 9 depicts examples of refined labeled images using local classification, obtained from an original image and a filtered image, according to an embodiment of the invention.

For purposes of illustration, FIG. 9 depicts examples of refined labeled images using local classification according to an embodiment of the invention. FIG. 9 illustrates a comparison between the refined labels 910 extracted from an original image and the refined labels extracted from a filtered image 920.

E. Enhance Foreground Colors Using Refined Labels

Figure 10:
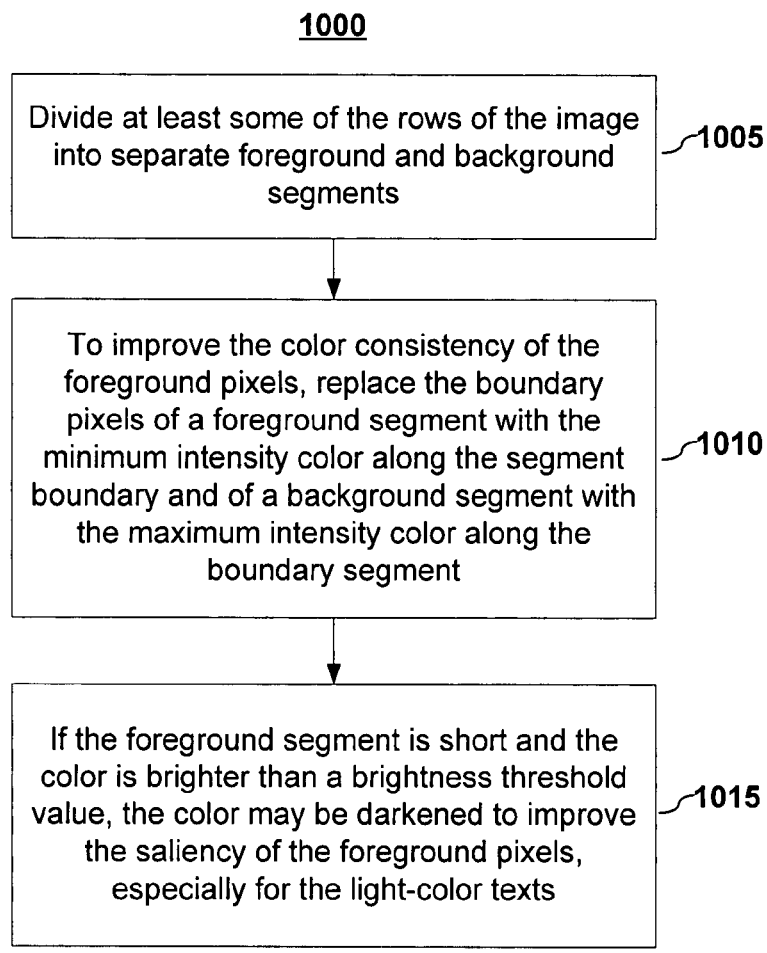
FIG. 10 illustrates a method for enhancing at least some of the foreground colors using the refined labels according to an embodiment of the invention.

In an embodiment, the refined labels may be used to enhance the colors of the image. FIG. 10 illustrates a method 1000 for enhancing at least some of the foreground colors using the refined labels according to an embodiment of the invention.

In the embodiment depicted in FIG. 10, at least some of the rows of the image may be divided (1005) into separate foreground and background segments. A segment may comprise one or more pixels. In an embodiment, a boundary pixel may be considered to be the pixel that is adjacent to a differently labeled pixel. Alternatively, a boundary may be one or more pixels associated with a pixel label transition. For example, a portion of a line of pixels may be "B . . . BFFF . . . FFFB . . . B," where B represents a background pixel, and F represents a foreground pixel. In an embodiment, foreground boundary pixels may be considered to be the foreground pixels immediately adjacent to the background pixel, as indicated in bold typeface: "B . . . BFFF . . . FFFB . . . B." Alternatively, a foreground boundary may be one or more of the foreground pixels associated with a pixel label transition, (e.g., adjacent to the background pixel segment). An example of a two-pixel foreground boundary is two foreground pixels adjacent to a pixel label transition as indicated in the bold typeface: "B . . . BFFF . . . FFFB . . . B".

In an embodiment, to improve the color consistency of the foreground pixels, one or more boundary pixels of a foreground segment may be replaced (1010) with the minimum intensity color along the segment boundary. And, in an embodiment, one or more boundary pixels of a background segment may be replaced (1010) with the maximum intensity color along the boundary segment.

In an embodiment, if the foreground segment is short (such as, by way of example but not limitation, less than or equal to five (5) pixels) and the color is brighter than a brightness threshold value (such as, by way of example but not limitation, an intensity greater than or equal to 100), the color may be darkened to improve the saliency of the foreground pixels, especially for the light-color texts.

Figure 11:
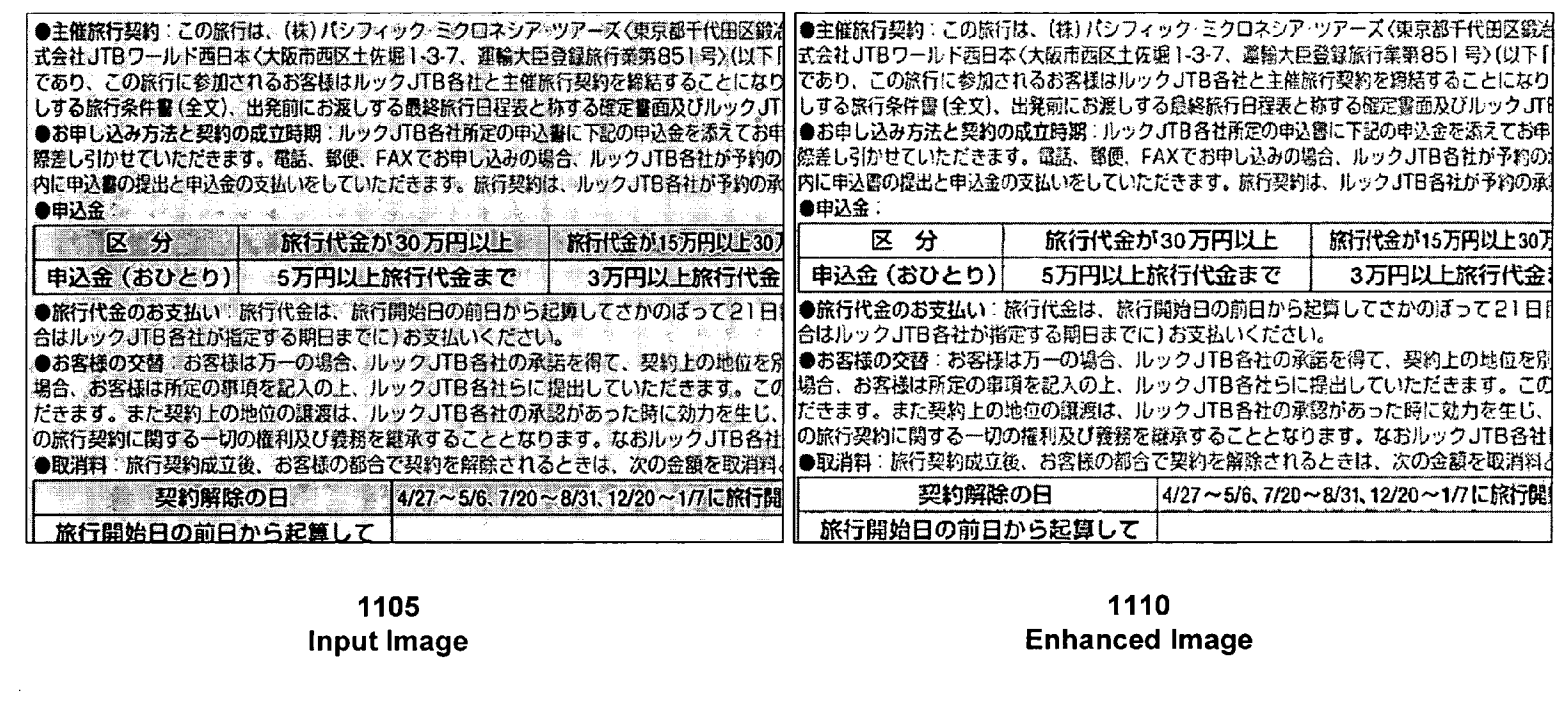

FIG. 11 depicts an example of an enhanced image 1110 obtained from an image 1105 according to an embodiment of the invention. Note that the improved distinction between the background and foreground image regions in the enhanced image 1110.

F. Refine the Labels by Regulating Their Shapes

Although image components such as texts or tables have regular shapes, image noise can introduce jagged shapes into image segments. In an embodiment, the image labels may be refined by regulating the shapes of the image segments to help reduce the jagged appearance of the image segments.

Figure 12A:
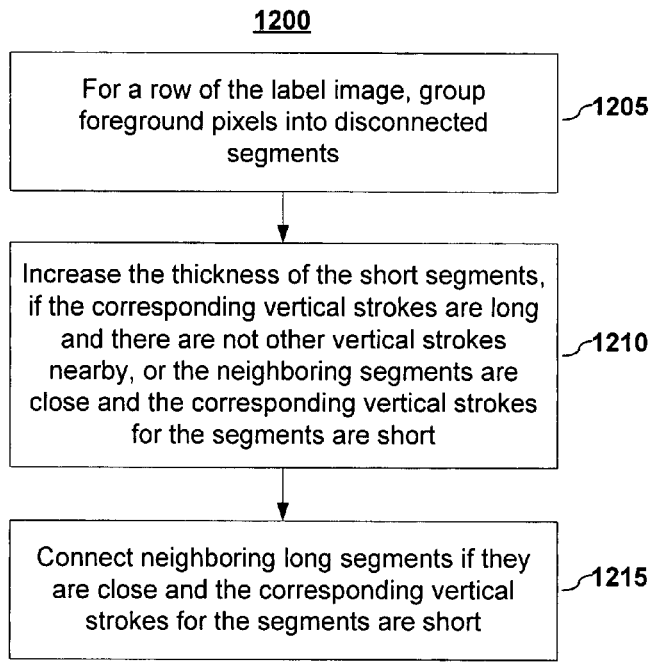
FIG. 12A illustrates a method for refining labels by regulating shapes of pixel segments according to an embodiment of the invention.

FIG. 12A illustrates a method 1200 for refining labels by regulating shapes of pixel segments according to an embodiment of the invention. In an embodiment, for at least some of the rows of the labeled image, the foreground pixels of a row may be grouped (1205) into disconnected segments. In an embodiment, a segment may mean one or more like pixels next to each other and in one line. The thickness of short segments (e.g., segments less than or equal to 2 pixels) may be increased (1210) if:

(1) at least one of the corresponding orthogonal, in this case vertical, strokes (or thicknesses) of the segment of interest are long (e.g., 10 pixels or longer) and there are no other vertical strokes nearby (e.g., within 2 pixels); or (2) the neighboring segments (e.g., the nearest line segments on the same row and at both ends of the segment of interest) are close (e.g., the gaps between the neighboring segment and the segment of interest are within 2 pixels) and the corresponding orthogonal, in this case vertical, strokes (or thicknesses) for the neighboring segments and the segment of interest are both short (e.g., within 3 pixels).

In an embodiment, the thickness of a segment may be increased by dilating the segment.

In an embodiment, neighboring long segments (e.g., greater than or equal to 10 pixels) may be connected (1215) if they are close (e.g, the gap between the neighboring segments is less than or equal to 2 pixels) and the corresponding orthogonal, in this case vertical, strokes (or thicknesses) for the neighboring segments are both short (e.g., less than or equal to 3 pixels).

Figure 12B:
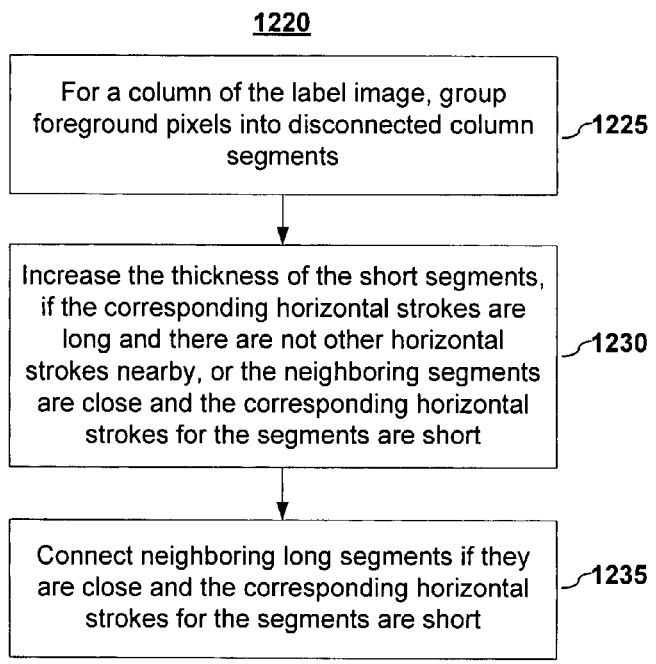
FIG. 12B illustrates a method for refining labels by regulating shapes of pixel segments according to an embodiment of the invention.

In an embodiment, the label image may be processed examining at least some of the columns in a manner similar to that performed for the rows. FIG. 12B illustrates a method 1220 for refining labels by regulating shapes of pixel segments according to an embodiment of the invention. In an embodiment, for at least some of the columns of the labeled image, the foreground pixels may be grouped (1225) into disconnected segments. The thickness of a short segment (e.g., less than or equal to 2 pixels) may be increased (1230) if:

(1) at least one of the corresponding orthogonal, in this case horizontal, strokes (or widths) of the segment of interest are long (e.g., 10 pixels or longer) and there are no other horizontal strokes nearby (e.g., within 2 pixels); or (2) the neighboring segments (e.g., the nearest line segments on the same column and at both ends of the segment of interest) are close (e.g., the gaps between the neighboring segment and the segment of interest are within 2 pixels) and the corresponding orthogonal, in this case horizontal, strokes (or widths) for the neighboring segments and the segment of interest are both short (e.g., within 3 pixels).

In an embodiment, neighboring long segments (e.g., greater than or equal to 10 pixels) may be connected (1235) if they are close (e.g, the gap between the neighboring segments is less than or equal to 2 pixels) and the corresponding orthogonal, in this case horizontal, strokes (or widths) for the neighboring segments are both short (e.g., less than or equal to 3 pixels).

It will be noted that the values given above for the size, proximity, and length threshold values (e.g., long, short, close, nearby, etc.) are given for purposes of illustration and not limitation. It should be noted that the various conditions or threshold values may be pre-set, may be user selected, or both. And, the various conditions or threshold values may be the same or different values.

In an embodiment, the methods of FIGS. 12A and 12B may both be performed or otherwise combined.

FIG. 13 depicts an example of an image prior to shape refinement 1305 and after shape refinement 1310 according to an embodiment of the invention. Note, for example, the speckled noise around character 1315 is removed or reduced in the post-processed corresponding character 1320 by regulating the shape of the foreground image.

G. System Implementations

Figure 14:
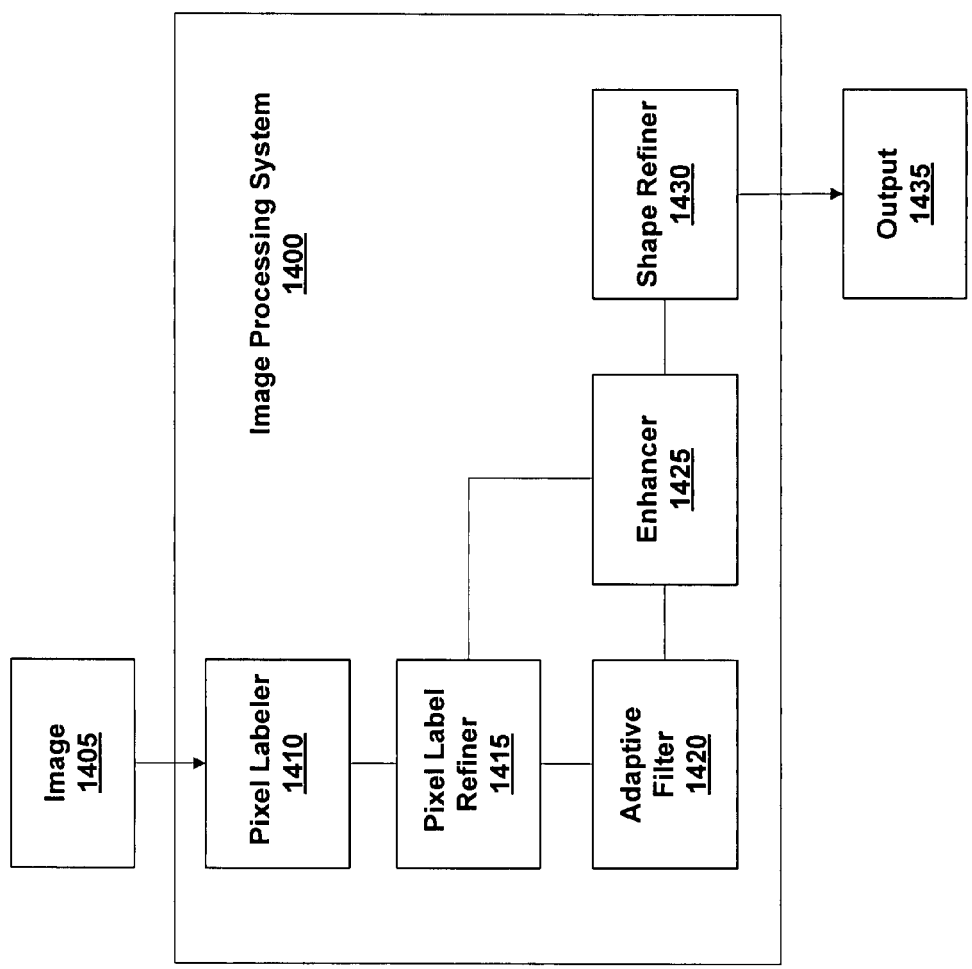
FIG. 14 illustrates an image processing system according to an embodiment of the invention.

FIG. 14 illustrates an image processing system 1400 according to an embodiment of the invention. In an embodiment, image processing system 1400 may comprise a pixel labeler 1410, a pixel label refiner 1415, an adaptive filter 1420, an enhancer 1425, and a shape refiner 1430. Each of the components within the system will be described in greater detail below.

As depicted in FIG. 14, a digital image or document 1405 may be provided to the system 1400. Because the present invention may operate on a portion of an input image, it shall be understood that input image 1405 may be construed to be the entire image or a portion of an image. In embodiments, the input image 1405 may be an image obtained from a scanner, camera, copier, facsimile machine, or the like. In embodiments, the image or document 1405 may be a digitally generated image. A "document" shall be construed to mean a digital file, the data that comprises the document (or a portion thereof), including without limitation pixel values, or the display of the digital file, which may be displayed electronically (such as on a computer screen) or displayed on a physical medium (such as a printed paper). As used herein, the terms "image" and "document" may be used interchangeably.

a) Pixel Labeler

In an embodiment, the system 1400 may comprise a pixel labeler 1410 or rough labeler 1410 that receives an image 1405 and labels at least some of the image 1405 at the pixel level. In an embodiment, each pixel of at least a portion of the image 1405 may be assigned a label, such as background or foreground pixel. It shall be noted the number, type, and classification of labels may vary. In an embodiment, the pixel labeler 1410 may rough label the pixels by performing one or more of the operations disclosed with reference to FIG. 2, wherein pixels are labeled by identifying dominant Gaussian clusters.

b) Pixel Label Refiner

In an embodiment, the system 1400 may include a pixel label refiner 1415 that receives image data and refines the labels. In an embodiment, the pixel label refiner 1415 may receive image data, including the rough label data, from the pixel labeler 1410.

In embodiments, the pixel label refiner 1415 uses the rough label data to refine the labeling. In an embodiment, the pixel label refiner 1415 may refine the pixel labels by performing one or more of the operations described with reference to FIG. 4.

In the depicted embodiment of FIG. 14, the pixel label refiner 1415 may also receive image data from an adaptive filter 1420. In an embodiment, a filtered image obtained from adaptive filter 1420 may be refined by pixel label refiner 1415.

c) Adaptive Filter

In an embodiment, the system 1400 may include an adaptive filter 1420 that receives image data and adjust at least a portion of the image. In one embodiment, adaptive filter 1420 may perform one or more the operations disclosed in reference to FIG. 6. For example, in an embodiment, given a scanner, printer, copier, or display color profile, the adaptive filter 1420 may adjust the image, or one or more layers derived from the image, so that the image colors more closely match the original document. In embodiments, the smoother may provide adjustments given the input source, the intended output display, or both.

In an embodiment, the adaptive filter 1420 may replace the color of a pixel using a weighted average of the surrounding pixel colors. In one embodiment, the weights may be determined by the label and color similarity between the pixel of interest and its surrounding pixels as discussed above.

In an embodiment, the output of the adaptive filter 1420 may be provided to the pixel label refiner 1415 to further refine the pixel labels using the adaptively filtered image.

d) Enhancer

In an embodiment, the system 1400 may include an enhancer 1425 that receives image data and adjust at least a portion of the image to enhance one or more colors in the image. In embodiments, enhancer 1425 may improve the color consistency of foreground pixels, background pixels, or both. For example, in an embodiment, enhancer 1425 may perform one or more of the operations disclosed in reference to FIG. 10.

e) Shape Refiner

In an embodiment, the system 1400 may include a shape refiner 1430 that receives image data and refines at least a portion of the image by regulating the shape of image segments. In embodiments, shape refiner 1430 may improve the image by regulating the shapes of foreground pixel segments, background pixels segments, or both. For example, in an embodiment, shape refiner 1430 may perform one or more the operations disclosed in reference to FIG. 12A, FIG. 12B, or both.

H. Alternative System Implementations

As noted previously, in embodiments, the output 1435 of the pixel label refiner may be a segmented image. One skilled in the art shall recognize that having obtained the refined labels, any of a number of post-processing operations may be performed.

Image segmentation may be used for a variety of purposes, including but not limited to vision systems, image recognition systems, image enhancement, image compression, watermarking, special effects, video editing, etc. These and other applications or processes may be considered post-processing operations and may be alternatively performed or alternatively included within a system, such as system 1400. Examples of image enhancement were provided above, and one skilled in the art shall recognize other enhancement that may be performed. Another application that may use the segmented image information, and which may be included within system 1400, is document compression.

a) Layer-Based Compression and Composite Generator

In an embodiment, system 1400, or portions thereof, may be used to help generate compressed images or documents. The compressed document may represent a composite of compressed segmented image layers and may have enhanced visual quality and much smaller file size. In an embodiment, the resulting compression document may be in a portable document format ("PDF"), but one skilled in the art shall recognize that other viewers and formats may be employed.

In an embodiment, the background and foreground image layers may be compressed using one or more compression algorithms. In an embodiment, a JPEG compression with the same or different compression ratios may be used to compress the background and foreground image layers.

In an embodiment, the composite of two compressed image layers (foreground and background) may be achieved by maintaining an image mask that identifies foreground pixels. In one embodiment, this mask may be kept intact with lossless compression, such as JBIG2, to minimize file size. In an embodiment, the foreground and background image layers may be downsampled, such as, for example, by a ratio of 3:1, and the mask may be maintained at a ratio of 1:1. In embodiments, system 1400 may include a downsampler (not shown) to downsample the foreground and/or background image layers.

It shall be noted that the present invention may be implemented in any computing device or system capable of processing the image data, including without limitation, a general-purpose computer and a specific computer, such as one intended for graphics processing. The present invention may also be implemented into other computing devices and systems, including without limitation, a digital camera, a printer, a scanner, a printer, a facsimile machine, a multimedia device, and any other device that processes, captures, transmits, or stores an image. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 15:
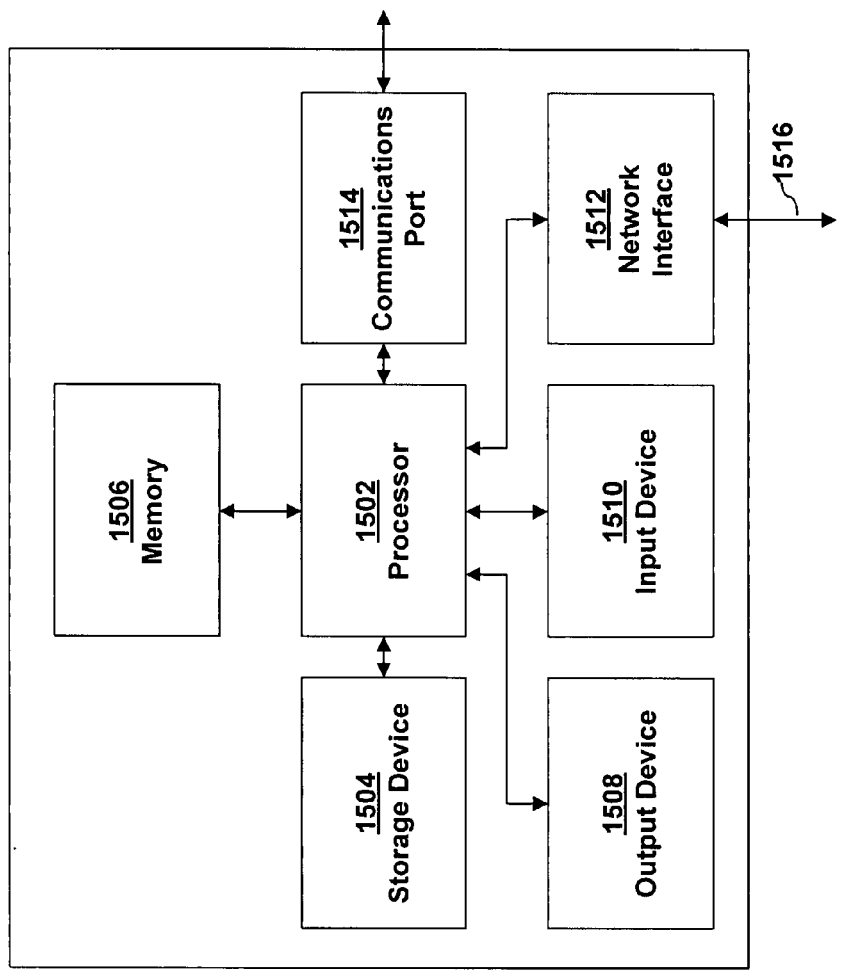
FIG. 15 illustrates a computing device or system according to an embodiment of the invention.

FIG. 15 depicts a functional block diagram of an embodiment of a computing device 1500 that may implement or embody an embodiment of the present invention. As illustrated in FIG. 15, a processor 1502 executes software instructions and interacts with other system components. In an embodiment, processor 1502 may be a general purpose processor such as an AMD processor, an INTEL x86 processor, a SUN MICROSYSTEMS SPARC, or a POWERPC compatible-CPU, or the processor may be an application specific processor or processors. A storage device 1504, coupled to processor 1502, provides long-term storage of data and software programs. Storage device 1504 may be a hard disk drive and/or another device capable of storing data, such as a computer-readable media (e.g., diskettes, tapes, compact disk, DVD, and the like) drive or a solid-state memory device. Storage device 1504 may hold programs, instructions, and/or data for use with processor 1502. In an embodiment, programs or instructions stored on or loaded from storage device 1504 may be loaded into memory 1506 and executed by processor 1502. In an embodiment, storage device 1504 holds programs or instructions for implementing an operating system on processor 1502. In one embodiment, possible operating systems include, but are not limited to, UNIX, AIX, LINUX, Microsoft Windows, and the Apple MAC OS. The operating system executes on, and controls the operation of, the computing system 1500.

An addressable memory 1506, coupled to processor 1502, may be used to store data and software instructions to be executed by processor 1502. Memory 1506 may be, for example, firmware, read only memory (ROM), flash memory, non-volatile random access memory (NVRAM), random access memory (RAM), or any combination thereof. In one embodiment, memory 1506 stores a number of software objects, otherwise known as services, utilities, or modules. One skilled in the art will also recognize that storage 1504 and memory 1506 may be the same items and function in both capacities. In an embodiment, one or more of the components of FIG. 14 may be modules stored in memory 1504, 1506 and executed by processor 1502.

In an embodiment, computing system 1500 provides the ability to communicate with other devices, other networks, or both. Computing system 1500 may include one or more network interfaces or adapters 1512, 1514 to communicatively couple computing system 1500 to other networks and devices. For example, computing system 1500 may include a network interface 1512, a communications port 1514, or both, each of which are communicatively coupled to processor 1502, and which may be used to couple computing system 1500 to other computer systems, networks, and devices.

In an embodiment, computing system 1500 may include one or more output devices 1508, coupled to processor 1502, to facilitate displaying graphics and text. Output devices 1508 may include, but are not limited to, a display, LCD screen, CRT monitor, printer, touch screen, or other device for displaying information. Computing system 1500 may also include a graphics adapter (not shown) to assist in displaying information or images on output device 1508.

One or more input devices 1510, coupled to processor 1502, may be used to facilitate user input. Input device 1510 may include, but are not limited to, a pointing device, such as a mouse, trackball, or touchpad, and may also include a keyboard or keypad to input data or instructions into computing system 1500.

In an embodiment, computing system 1500 may receive input, whether through communications port 1514, network interface 1516, stored data in memory 1504/1506, or through an input device 1510, from a scanner, copier, facsimile machine, or other computing device.

One skilled in the art will recognize no computing system is critical to the practice of the present invention. One skilled in the art will also recognize that a number of the elements described above may be physical and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A method for processing a digital image comprising a plurality of pixels, wherein a pixel from the plurality of pixels may comprise values for one or more color channels, the method comprising the steps of:

identifying from the plurality of pixels a set of foreground pixels;

selecting at least some of the pixels from the set of foreground pixels and for each selected foreground pixel:

classifying pixels in a region surrounding the selected foreground pixel into one of two sets:

a first set of pixels comprising pixels in the region that have an intensity that is within an intensity threshold value of the intensity of the selected foreground pixel; and a second set of pixels comprising pixels in the region that do not have an intensity that is within an intensity threshold value of the intensity of the selected foreground pixel;

computing a first average intensity of the first sets of pixels and a second average intensity of the second set of pixels;

for a digital image with a background generally lighter than its foreground, responsive to the first average intensity being close to or brighter than the second average intensity, classifying the selected foreground pixel as a background pixel;

obtaining a filtered image by smoothing the pixels with a foreground label separately from the pixels with a background label;

refining the foreground and background pixel labels of the filtered image;

using the foreground and background pixel labels to enhance the colors of at least some of the pixels with a foreground label; and further refining the foreground and background pixel labels by regulating shapes of pixel segments;

wherein the step of further refining the foreground and background pixel labels by regulating shapes of pixel segments comprises:

grouping the foreground pixels into linear segments;

responsive to a segment being less than a size threshold value, increasing a thickness of the segment if at least one corresponding orthogonal stroke of the segment exceeds a first long length threshold value and there are no other orthogonal strokes within a first proximity threshold value distance;

responsive to a segment being less than the size threshold value, increasing a thickness of the segment if a neighboring segment is within a second proximity threshold value and their corresponding orthogonal strokes are less than a first short length threshold value; and responsive to neighboring segments exceeding a second long length threshold value, connecting the neighboring segments if they are within a third proximity threshold value and their corresponding orthogonal strokes are less than a second short length threshold value.

2. The method of claim 1 wherein the step of identifying from the plurality of pixels a set of foreground pixels comprises:

identifying, for at least one of the color channels, a dominant cluster of pixels, wherein the set of foreground pixels comprises the dominant cluster of pixels.

3. The method of claim 2 wherein the step of identifying, for at least one of the color channels, a dominant cluster of pixels comprises:

for a color channel:
computing a histogram; and
computing a dominant cluster of pixels in a region of the histogram.

4. The method of claim 3 wherein, responsive to a digital image with a background generally lighter than its foreground, the region of the histogram is the darker region of the color channel.

5. The method of claim 3 wherein the set of foreground pixels comprises a dominant cluster of pixels for each of the color channels.

6. The method of claim 1 further comprising:

for a digital image with a background generally darker than its foreground, responsive to the first average intensity being close to or darker than the second average intensity, classifying the selected foreground pixel as a background pixel.

7. A non-transitory computer readable medium storing one or more sequences of instructions to direct an instruction-executing processor device to perform at least the steps of claim 1.

8. A method for segmenting into foreground and background pixels a digital image comprising a plurality of pixels, wherein pixels from the plurality of pixels may be represented by a set of color channels values, the method comprising the steps of:

assigning a foreground or a background label to pixels of the plurality of pixels;

refining the labels by:
classifying pixels in a region surrounding a selected foreground pixel into two sets: (1) a first set of pixels comprising pixels in the region that have an intensity that is within an intensity threshold value of the intensity of the selected foreground pixel; and (2) a second set of pixels comprising pixels in the region that do not have an intensity that is within an intensity threshold value of the intensity of the selected foreground pixel;

computing a first average intensity of the first sets of pixels and a second average intensity of the second set of pixels;

responsive to a light background and the first average intensity being close to or brighter than the second average intensity, classifying the selected foreground pixel as a background pixel;

responsive to a dark background and the first average intensity being close to or darker than the second average intensity, classifying the selected foreground pixel as a background pixel; and refining the foreground and background pixel labels by regulating shapes of pixel groups by performing the steps comprising:

grouping the foreground pixels into linear segments;

responsive to a segment being less than a size threshold value, increasing a thickness of the segment if at least one corresponding orthogonal stroke of the segment exceeds a first long length threshold value and there are no other orthogonal strokes within a first proximity threshold value distance;

responsive to a segment being less than the size threshold value, increasing a thickness of the segment if a neighboring segment is within a second proximity threshold value and their corresponding orthogonal strokes are less than a first short length threshold value; and responsive to neighboring segments exceeding a second long length threshold value, connecting the neighboring segments if they are within a third proximity threshold value and their corresponding orthogonal strokes are less than a second short length threshold value.

9. The method of claim 8 wherein the step of assigning a foreground or a background label to pixels of the plurality of pixels comprises:

labeling a pixel from the plurality of pixels as a foreground pixel that is included in a dominant cluster of a region of at least one of the color channels; and labeling at least some of the other pixels from the plurality of pixels as background pixels.

10. A non-transitory computer readable medium storing one or more sequences of instructions to direct an instruction-executing processor device to perform at least the steps of claim 8.

11. A system for segmenting into foreground and background pixels a digital image comprising a plurality of pixels, wherein pixels from the plurality of pixels may be represented by a set of color channels values, the system comprising:

a pixel labeler, coupled to receive an image comprising pixels, that assigns a foreground or a background label to pixels of the plurality of pixels;

a pixel label refiner that refines the labels by:
classifying pixels in a region surrounding a selected foreground pixel into two sets: (1) a first set of pixels comprising pixels in the region that have an intensity that is within an intensity threshold value of the intensity of the selected foreground pixel; and (2) a second set of pixels comprising pixels in the region that do not have an intensity that is within an intensity threshold value of the intensity of the selected foreground pixel;

computing a first average intensity of the first sets of pixels and a second average intensity of the second set of pixels;

responsive to a light background and the first average intensity being close to or brighter than the second average intensity, classifying the selected foreground pixel as a background pixel;

a shape refiner that refines the foreground and background pixel labels by regulating shapes of foreground pixel segments by performing the steps comprising:

grouping the foreground pixels into linear segments;

responsive to a segment being less than a size threshold value, increasing a thickness of the segment if at least one corresponding orthogonal stroke of the segment exceeds a first long length threshold value and there are no other orthogonal strokes within a first proximity threshold value distance;

responsive to a segment being less than the size threshold value, increasing a thickness of the segment if a neighboring segment is within a second proximity threshold value and their corresponding orthogonal strokes are less than a first short length threshold value; and responsive to neighboring segments exceeding a second long length threshold value, connecting the neighboring segments if they are within a third proximity threshold value and their corresponding orthogonal strokes are less than a second short length threshold value;

wherein at least one of the pixel labeler, the pixel label refiner, and the shape refiner is embodied at least in part in one or more processors.

12. The system of claim 11 further where-in the pixel label refiner also performs the step of:

responsive to a dark background and the first average intensity being close to or darker than the second average intensity, classifying the selected foreground pixel as a background pixel.

13. The system of claim 11 further comprising:

an adaptive filter that generates a filtered image by smoothing pixels with a foreground label separately from pixels with a background label.

14. The system of claim 11 further comprising:

an enhancer that uses the foreground and background pixel labels to enhance the colors of at least some of the pixels with a foreground label.

15. The system of claim 11 further comprising:

a layer-based compression module that compresses at least one of foreground pixels and background pixels.

* * * * *